(12) United States Patent
Yamamoto et al.

(10) Patent No.: US 10,001,423 B2
(45) Date of Patent: Jun. 19, 2018

(54) PRESSURE MEASUREMENT APPARATUS AND PROGRAM FOR MEASURING PRESSURE

(71) Applicant: NITTA Corporation, Osaka (JP)

(72) Inventors: Hisashi Yamamoto, Nara (JP); Akira Ozeki, Nara (JP)

(73) Assignee: Nitta Corporation, Osaka (JP)

( * ) Notice: Subject to any disclaimer, the term of this patent is extended or adjusted under 35 U.S.C. 154(b) by 0 days. days.

(21) Appl. No.: 15/367,486

(22) Filed: Dec. 2, 2016

(65) Prior Publication Data
US 2017/0211994 A1   Jul. 27, 2017

(30) Foreign Application Priority Data

Dec. 3, 2015 (JP) ................... 2015-236579

(51) Int. Cl.
| | |
|---|---|
| *G01L 1/04* | (2006.01) |
| *G01L 1/22* | (2006.01) |
| *G01L 5/00* | (2006.01) |

(52) U.S. Cl.
CPC ............ *G01L 1/225* (2013.01); *G01L 1/2287* (2013.01); *G01L 5/0085* (2013.01)

(58) Field of Classification Search
CPC ...... G01L 1/225; G01L 1/2287; G01L 5/0085
USPC .................................................. 73/862.632
See application file for complete search history.

(56) References Cited

U.S. PATENT DOCUMENTS

| | | | | | |
|---|---|---|---|---|---|
| 5,376,999 | A | * | 12/1994 | Hwang | G03G 15/0131 399/299 |
| 6,910,376 | B2 | * | 6/2005 | Maenpaa | D21F 3/0227 73/159 |
| 2009/0244203 | A1 | * | 10/2009 | Mita | B41J 2/14233 347/68 |
| 2010/0103097 | A1 | * | 4/2010 | Shiina | G06F 3/0488 345/157 |
| 2012/0198945 | A1 | * | 8/2012 | Yoneyama | B25J 13/083 73/862.042 |

FOREIGN PATENT DOCUMENTS

JP         2012233838 A        11/2012

* cited by examiner

*Primary Examiner* — Max Noori
(74) *Attorney, Agent, or Firm* — Fox Rothschild LLP; Robert J. Sacco; Carol E. Thorstad-Forsyth

(57) ABSTRACT

A pressure measurement device includes a platen, a pressure sensor, a signal acquisition section, and a data processing section. The pressure sensor includes a plurality of pressure-sensitive points arranged on the platen. The signal acquisition section is configured to acquire measurement data that is obtained when a measurement object in contact with a surface of the platen passes over the pressure sensor a plurality of times. The measurement object moves relative to the platen and along a circular orbit on the platen. The data processing section is configured to calculate periods in each of which the measurement object passes over the pressure sensor and to acquire period data for each of the periods from the measurement data.

6 Claims, 10 Drawing Sheets

PRESSURE MEASUREMENT APPARATUS AND PROGRAM FOR MEASURING PRESSURE

CROSS REFERENCE TO RELATED APPLICATION

The present application claims benefit of Japanese Patent Application No. 2015-236579 filed on Dec. 3, 2015. This application is incorporated herein by reference in its entirety.

BACKGROUND OF THE INVENTION

Field of the Invention

The present invention relates to a pressure measurement device and a pressure measurement program.

Description of the Related Art

As a pressure measurement device, there is disclosed a nip pressure measuring device provided with a pressure-sensitive sensor in which a linear first electrode and a linear second electrode are arranged to intersect each other so that pressure-sensitive layers, whose electrical characteristics change according to applied pressure, are sandwiched between the first electrode and the second electrode (for example, Japanese Patent Laid-Open No. 2012-233838).

The nip pressure measuring device measures a resistance value that changes according to pressure applied between a pair of rollers. The pressure-sensitive sensor with the first electrode arranged in the axial direction of the rollers is provided on one of the rollers and is sandwiched between the rollers.

SUMMARY OF THE INVENTION

However, for example, when the contact pressure between a rotating platen and a measurement object revolving on the platen is measured by the pressure-sensitive sensor described in the Japanese Patent Laid-Open No. 2012-233838 described above, there is a problem that the number of data becomes enormous as the number of revolutions increases, and the work of extracting only useful data from the obtained measurement data is complicated.

An object of the present invention is to provide a pressure measurement device and a non-transitory computer readable medium each capable of easily extracting useful data from measurement data obtained by measuring the contact pressure between a platen and a measurement object relatively revolving on the platen.

A pressure measurement device according to the present invention includes a platen, a pressure sensor, a signal acquisition section, and a data processing section. The pressure sensor includes a plurality of pressure-sensitive points arranged on the platen. The signal acquisition section is configured to acquire measurement data that is obtained when a measurement object in contact with a surface of the platen passes over the pressure sensor a plurality of times. The measurement object moves relative to the platen and along a circular orbit on the platen. The data processing section is configured to calculate periods in each of which the measurement object passes over the pressure sensor and configured to acquire period data for each of the periods from the measurement data.

A non-transitory computer-readable medium having computer-executable instructions for performing a method of measuring pressure according to the present invention includes a step of acquiring measurement data, a step of calculating periods in each of which the measurement object passes over the pressure sensor, and a step of acquiring period data for each of the periods from the measurement data. The measurement data is obtained when a measurement object in contact with a surface of a platen passes over the pressure sensor a plurality of times. The measurement object moves relative to the platen and along a circular orbit on the platen. The pressure sensor includes a plurality of pressure-sensitive points arranged on the platen.

According to the present invention, the period is calculated, and thereby the period data for each period is easily extracted from the obtained measurement data. The position of the measurement object is more accurately determined by superposition of the period data. Therefore, on the basis of the period data, the pressure measurement device easily extracts only useful portions from the measurement data.

BRIEF DESCRIPTION OF THE DRAWINGS

FIG. 5A is a plan view showing a position of the pressure sensor and a position of the substrate in a first stage; FIG. 5B shows the pressure-sensitive points overlapping the outer edges of the substrate in the first stage, the points of overlap (intersection) being shown in time series; FIG. 5C is a plan view showing a position of the pressure sensor and a position of the substrate in a second stage; FIG. 5D shows the pressure-sensitive points overlapping the outer edges of the substrate in the second stage, the points of overlap (intersection) being shown in time series; FIG. 5E is a plan view showing a position of the pressure sensor and a position of the substrate in a third stage; and FIG. 5F shows the pressure-sensitive points overlapping the outer edges of the substrate in the third stage, the points of overlap (intersection) being shown in time series;

FIG. 7A is a plan view showing an example of a platen and a measurement object; FIG. 7B is an example of measurement data; and FIG. 7C shows an example of a data array;

DETAILED DESCRIPTION OF THE PREFERRED EMBODIMENT(S)

(Overall Configuration)

Figure 1:
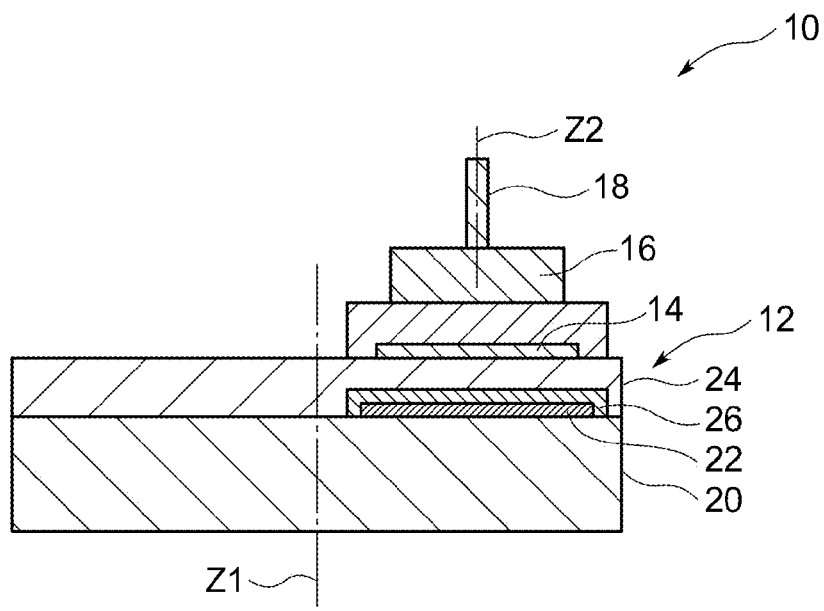
FIG. 1 is a longitudinal cross-sectional view schematically showing a silicon wafer polishing device which employs a pressure measurement device according to the present embodiment.

In the following, embodiments according to the present invention will be described in detail with reference to the accompanying drawings. A silicon wafer polishing device 10 shown in FIG. 1 is an example of a device which employs a pressure measurement device according to the present embodiment. The silicon wafer polishing device 10 includes a platen 12 and a head 16. The head 16 holds a substrate 14, being a measurement object, such that the substrate 14 is in contact with the platen 12.

The platen 12 is held rotatably about the central axis Z1 by a device main body (not shown). The platen 12 includes a polishing platen 20 and a polishing cloth (or pad) 24 provided over the upper surface of the polishing platen 20. In the case of the present embodiment, a pressure sensor 22 extends linearly on the surface of the polishing platen 20 of the platen 12.

The head 16 is disposed above the platen 12 and holds the substrate 14 with the surface of the substrate 14 facing downward. The head 16 is held by the device main body (not shown) through a main spindle 18. The main spindle 18 is movable in up and down directions along the center axis Z2 and rotatable about the center axis Z2. The head 16 and the platen 12 move relative to each other, and the head 16 moves along a circular orbit on the surface of the platen 12, relative to the platen 12. In the case of the present embodiment, the substrate 14 held by the head 16 revolves on the platen 12 as the platen 16 rotates. The head 16 is provided with a retainer ring (not shown) around the lower surface thereof.

Figure 2:
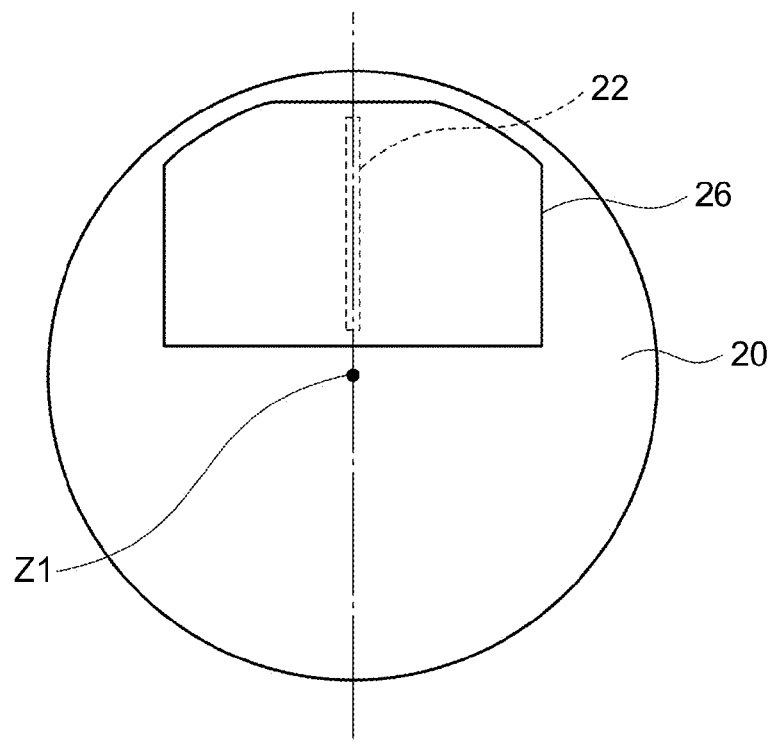
FIG. 2 is a plan view schematically showing a configuration of a polishing platen of the silicon wafer polishing device.

As shown in FIG. 2, in the case of the present embodiment, the pressure sensor 22 has a linear shape and is disposed on a straight line (normal) passing through the center of the platen 12. A coating film 26 may be provided on an upper surface of the pressure sensor 22. The coating film 26 includes a resin film, such as polyethylene terephthalate (PET), or the like. The coating film 26 protects the pressure sensor 22. The coating film 26 supports the substrate 14 when the substrate 14 passes over the pressure sensor 22, to keep the substrate parallel to the pressure sensor 22. It is preferred that the surface area of the coating film 26 is larger than the area of the surface of the substrate 14.

Figure 3:
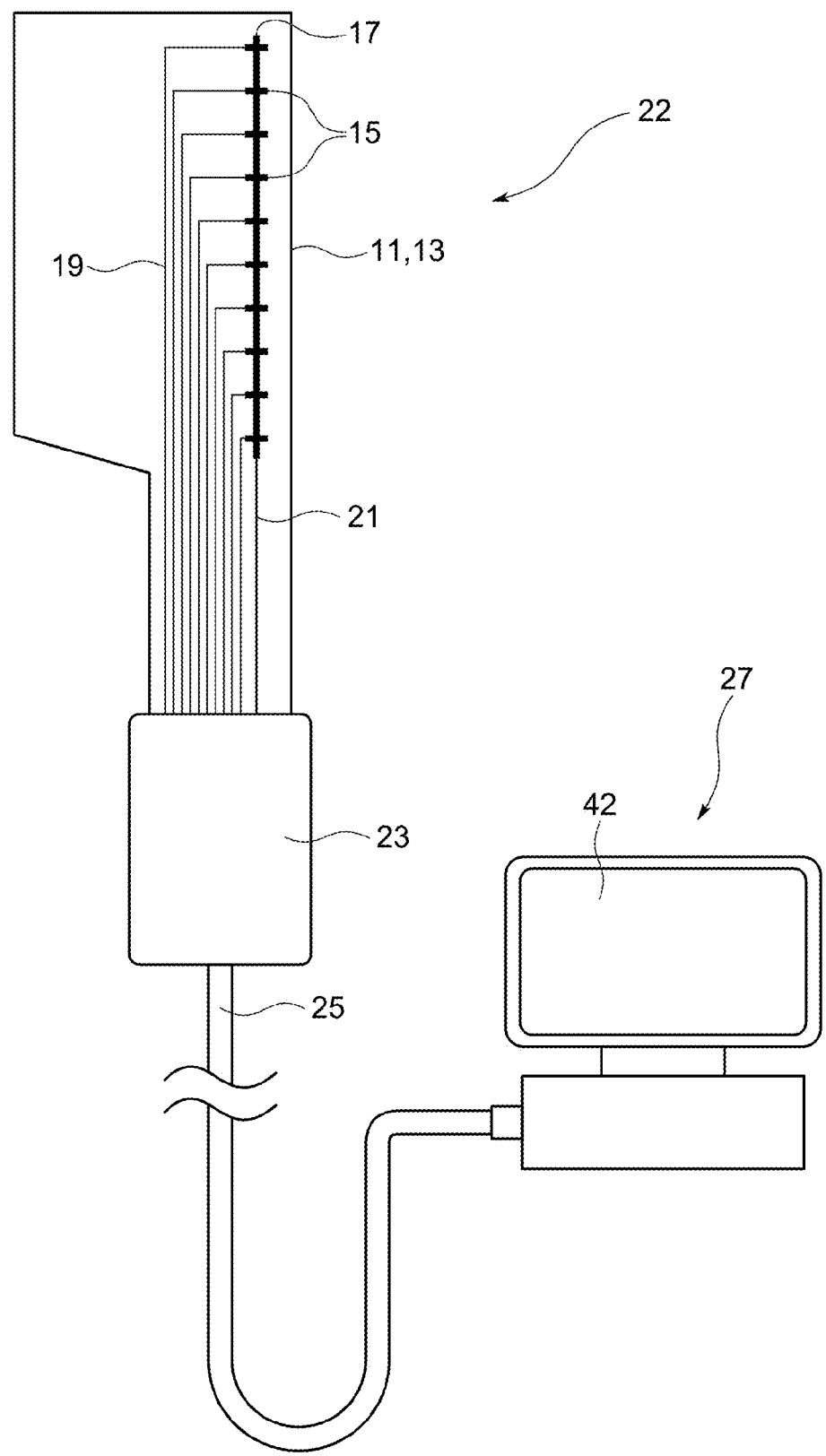
FIG. 3 is a schematic view showing a configuration of a pressure sensor.

As shown in FIG. 3, the pressure sensor 22 includes a first insulating sheet 11, a second insulating sheet 13, a plurality of linear first electrodes 15, and a linear second electrode 17. The first insulating sheet 11 faces the second insulating sheet 13. The linear first electrodes 15 are supported by the lower surface of the first insulating sheet 11. The linear second electrode 17 is supported by the upper surface of the second insulating sheet 13 such that the second electrode 17 extends crosswise to the first electrodes 15. The surfaces of the first electrodes 15 are covered with a pressure-sensitive layer (not shown). The surface of the second electrode 17 is covered with a pressure-sensitive layer (not shown). When pressure is not applied to the first electrodes 15 and the second electrode 17, which are covered with the pressure-sensitive layers, fine unevenness on the surfaces of the pressure-sensitive layers prevent the first electrodes 15 and the second electrode 17 from coming in contact with each other.

The first insulating sheet 11 and the second insulating sheet 13 are elastically deformable sheet-shaped members having the same size and the same plane shape. Each of the first insulating sheet 11 and the second insulating sheet 13 may include, for example, polyethylene terephthalate resin.

The plurality of first electrodes 15 are arranged at equal intervals and in parallel with each other. The number of the first electrodes 15 may be appropriately selected in accordance with the size of the platen 12 and the size of the substrate 14. In FIG. 3, there are 20 first electrodes 15 by way of example. One end of each of the first electrodes 15 is electrically connected to a handle section 23 via a wiring 19. The second electrode 17 is composed of one electrode. The second electrode 17 is supported by the upper surface of the second insulating sheet 13 such that the second electrode 17 intersects with all the first electrodes 15. One end of the second electrode 17 is electrically connected to the handle section 23 via a wiring 21. The handle section 23 is electrically connected to an information processing terminal 27 via a rotary connector (not shown).

The pressure-sensitive layer is filled with pressure-sensitive ink. The pressure-sensitive ink has a property that the electric resistance of the ink decreases with the application of pressure to the ink. When pressure is applied to a point of intersection (overlap) between the first electrode 15 and the second electrode 17 (hereinafter may referred to as "pressure-sensitive point"), an electric resistance value between the first electrode 15 and the second electrode 17 changes with the applied pressure.

The pressure sensor 22 configured as described above is disposed on the polishing platen 20 so that the second electrode 17 lies on the straight line passing through the center of the platen 12.

The distal end portions of the wirings 19 and 21 of the pressure sensor 22 disposed on the polishing platen 20 are inserted into a cutout section (not shown) having an opening in the thickness direction of the polishing platen 20. The distal ends of the wirings 19 and 21 of the pressure sensor 22 are connected to the handle section 23 disposed on the back of the polishing platen 20. Wirings 25 drawn out from the handle section 23 are electrically connected to the information processing terminal 27 via the rotary connector.

Figure 4:
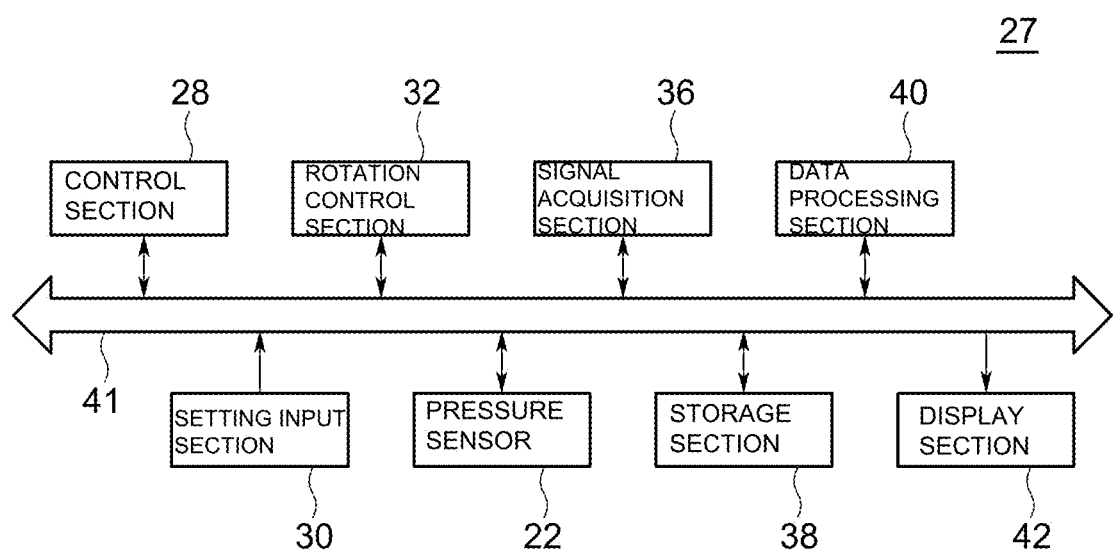
FIG. 4 is a block diagram showing a circuit configuration of an information processing terminal according to the present embodiment.

As shown in FIG. 4, the information processing terminal 27 includes a control section 28, which controls the entire information processing terminal 27. The control section 28 reads out various programs, such as a base program and a pressure measurement processing program, which are stored beforehand, and controls the entire information processing terminal 27 according to the programs. The information processing terminal 27 is provided with a setting input section 30, a rotation control section 32, a signal acquisition section 36, a storage section 38, a data processing section 40, and a display section 42. The setting input section 30, the rotation control section 32, the signal acquisition section 36, the storage section 38, the data processing section 40, and the display section 42 are connected to the control section 28 via a control bus 41. Further, the pressure sensor 22 is connected to the control bus 41.

The setting input section 30 sends out, to the control section 28, measurement commands, such as the number of rotation of the platen 12, the number of rotation (or revolution) of the head 16, the scanning interval (scanning frequency or timing), the measurement period, and the like.

The control section 28 performs the processing according to the measurement commands given from the setting input section 30.

In response to the measurement commands given from the setting input section 30, the rotation control section 32 generates control signals for rotating the platen 12 and the head 16 at the predetermined number(s) of rotations (or revolutions) in a predetermined time, and controls the amount of electric power supplied to a drive section (not shown).

The signal acquisition section 36 supplies the electric power to the pressure sensor 22 and acquires an electric resistance value at each pressure-sensitive point of the pressure sensor 22 for each scanning, and converts the electric resistance values into digital signals. For each scanning, the electric resistance values converted into the digital signals are stored, in the storage section 38, as measurement data corresponding to the respective pressure-sensitive points. In the present specification, the measurement data obtained by one scanning is referred to as the measurement data for one frame.

Figure 5E:
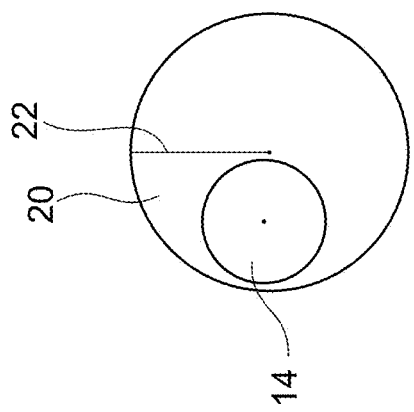
FIG. 5A to FIG. 5F are schematic views showing positional relationships between the pressure sensor and a substrate, and showing pressure-sensitive points overlapping outer edges of the substrate, FIGS. 5A, 5C, and 5E and FIGS. 5B, 5D, and 5F being arranged in time series.
Figure 5C:
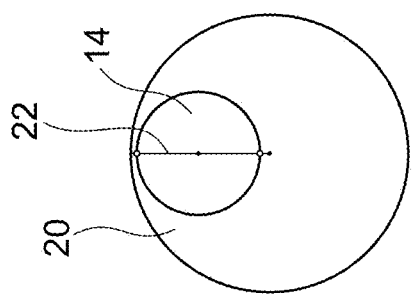
Figure 5A:
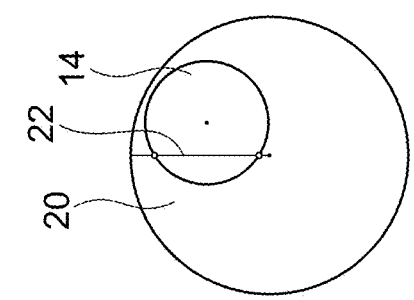
Figure 5F:
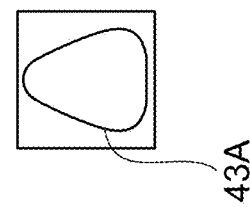
Figure 5D:
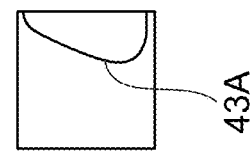
Figure 5B:
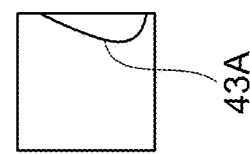

The measurement data acquired from the pressure sensor 22 by the signal acquisition section 36 will be described with reference to FIG. 5A to FIG. 5F. FIG. 5A, FIG. 5C, and FIG. 5E are plan views showing, in a stepwise manner, the positional relationships between the platen 12 and the substrate 14 moving over the platen 12 and relative to the platen 12. FIG. 5B, FIG. 5D, and FIG. 5F are schematic views arranged in time series and each shows the pressure-sensitive points that overlap the outer edges of the substrate 14 while the substrate 14 passes over the pressure sensor 22. As shown in the drawings, although the substrate 14 has a circular shape, measurement data 43A obtained has a distorted shape, that is, a substantially triangular shape. The measurement data 43A refers to polar coordinate data.

The storage section 38 sequentially stores the measurement data for each scanning. The storage section 38 stores various data obtained by the data processing section 40 described below.

The data processing section 40 reads the measurement data and performs various processing to obtain first time-series data, second time-series data, period data, replacement data, that is, orthogonal coordinate data, and pressure-sensitive data, each of which is described below.

(Data Processing Procedure)

Figure 6:
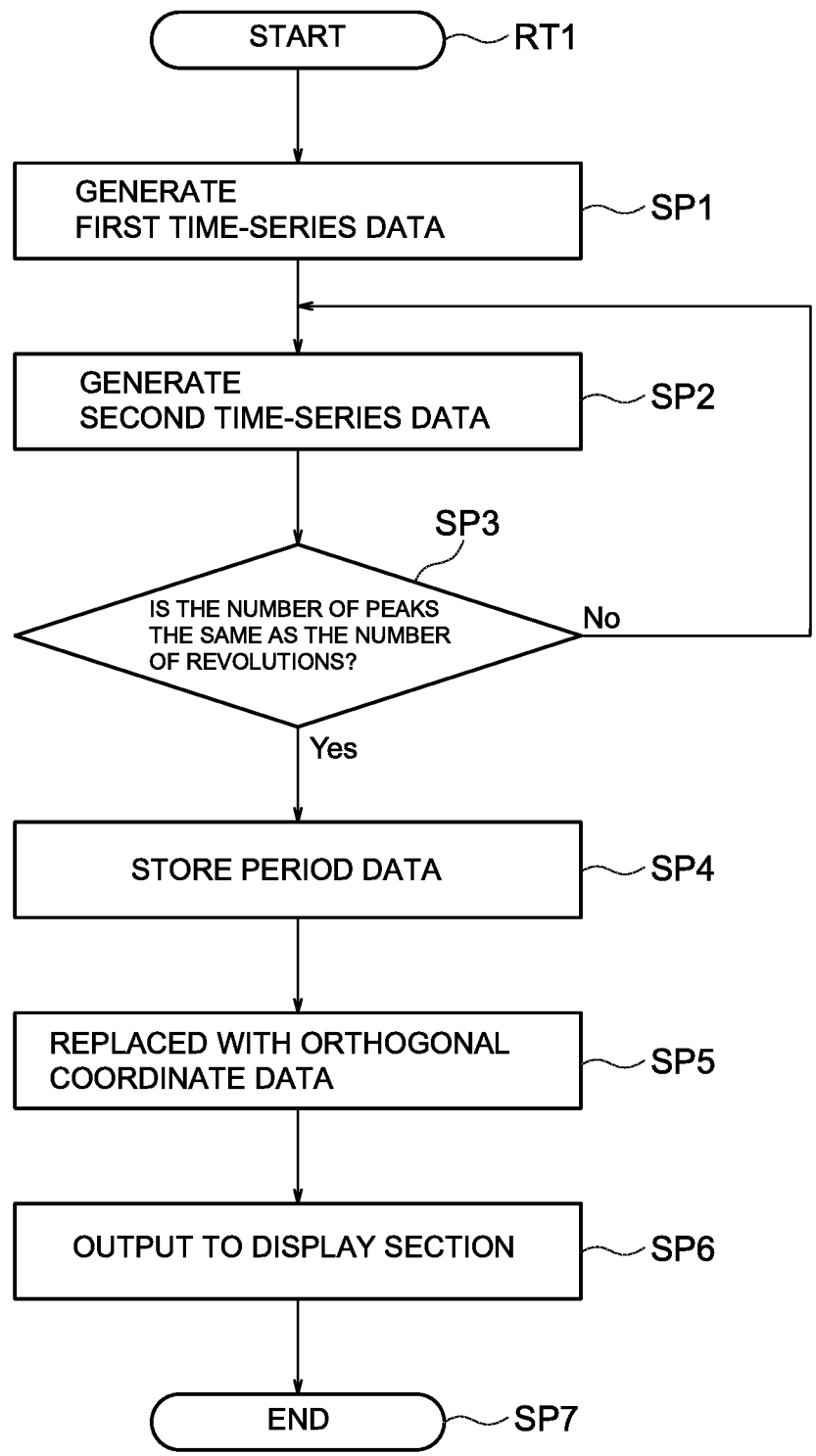
FIG. 6 is a flowchart showing a procedure for pressure measurement processing.

A data processing procedure of the information processing terminal 27 will be described with reference to FIG. 6. The platen 12 and the substrate 14 move relative to each other and the substrate 14 passes over the pressure sensor 22. Thereby, the measurement data is obtained from the pressure sensor 22.

According to a data processing program, the control section 28 executes a start step of starting a data processing procedure RT1 and moves on to step SP1. The data processing section 40 reads the measurement data from the storage section 38, and calculates a total load value x, which is the sum of the load values at the pressure-sensitive points, for each frame. The data processing section 40 generates first time-series data composed of the total load values x. The data processing section 40 stores the first time-series data in the storage section 38, and moves on to step SP2.

In step SP2, the data processing section 40 reads the first time-series data, and calculates an autocorrelation coefficient r(h) with the use of the following formula (Formula 1), to generate second time-series data composed of the autocorrelation coefficient r(h). Here, "h" denotes the number of data referred to, to calculate the autocorrelation coefficient, and "N" denotes the number of frames. It is effective and preferred that the autocorrelation coefficient r(h) is calculated with respect to the measurement data of the half the number of frames.

$$r(h) = \frac{\sum_{i=1}^{N-h}(x_i - \bar{x})(x_{i+h} - \bar{x})}{\sum_{i=1}^{N}(x_i - \bar{x})^2}$$ [Formula 1]

The data processing section 40 stores the second time-series data in the storage section 38, and moves on to step SP3. The second time-series data enables extracting only vibration components from the first time-series data with high noise.

In step SP3, the data processing section 40 calculates the number of peaks of the autocorrelation coefficient r(h) from the second time-series data, and determines whether the number of peaks is the same as the number of revolutions. The number of revolutions may be determined on the basis of the conditions such as the preset number of rotations of the platen 12, time, or the like, or on the basis of the number of regular vibrations in the second time-series data.

In step SP3, in a case where a negative result is obtained (in a case where the number of the peaks is different from the number of the revolutions), the negative result represents that a high amount of noise is included in the second time-series data. In this case, the data processing section 40 returns to step SP2. Next, the processing loop between step SP2 and step SP3 is repeated until the number of peaks of the autocorrelation coefficient r(h) coincides with the number of revolutions in step SP3. Thereby, the second time-series data without noise is obtained. In this case, the data processing section 40 reduces the value h. Examples of a method of reducing the value h include a method of reducing h by half in accordance with the number of repetition of the processing loop between step SP2 and step SP3.

In step SP3, in a case where a positive result is obtained (in a case where the number of the peaks is the same as the number of the revolutions), the positive result represents that the second time-series data without noise is obtained. In this case, the data processing section 40 moves on to step SP4.

In step SP4, on the basis of the second time-series data, the data processing section 40 calculates, from a peak interval (an interval between the timings of the peaks), one period (or a time interval) between a crossing of the substrate 14 over the pressure sensor 22 and the next crossing of the substrate 14 over the pressure sensor 22. On the basis of the calculated period (time interval), the data processing section 40 extracts the measurement data of each period from a group of measurement data, and stores the extracted measurement data as the period data in the storage section 38, and moves on to step SP5. For example, given that the measurement is performed at the scanning frequency of 1000 Hz for one minute of measurement time and the substrate 14 is revolved on the platen 12 at one revolution per second, the measurement data of 60000 frames and the period data of 60 revolutions are obtained.

In step SP5, the data processing section 40 reads the period data, and replaces the period data, which is composed of polar coordinate data, with orthogonal coordinate data (that is, the data processing section 40 converts the period data into orthogonal coordinate data). Thus, the replacement data, being the orthogonal coordinate data, is obtained.

Figure 7A:
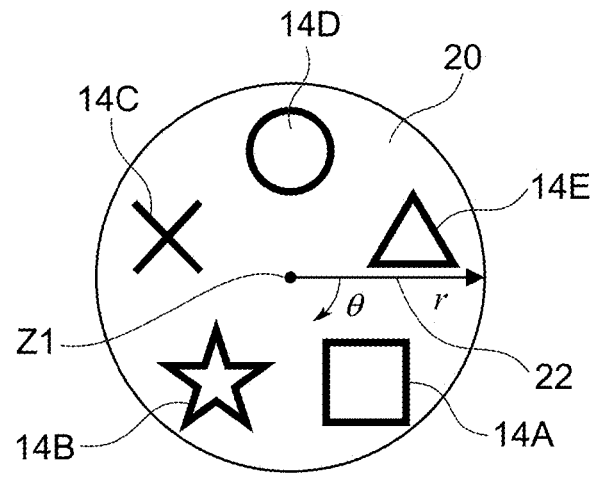
FIG. 7A to FIG. 7C are schematic views illustrating an operation of a data processing section according to the present embodiment.
Figure 7B:
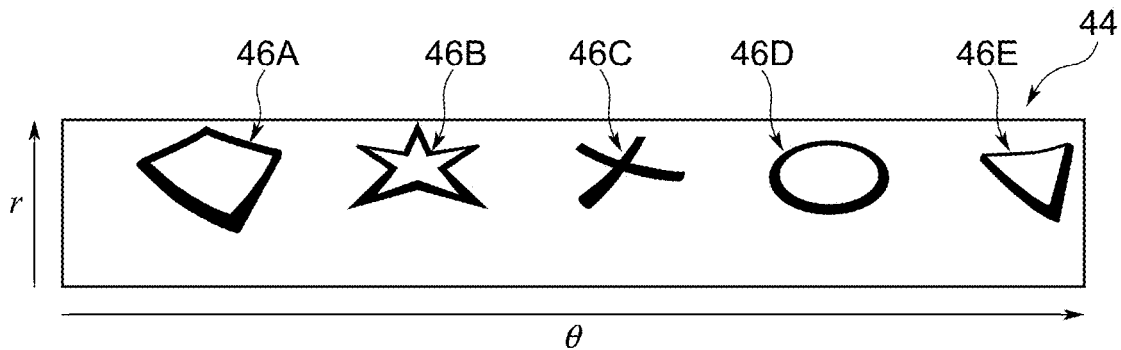
Figure 7C:
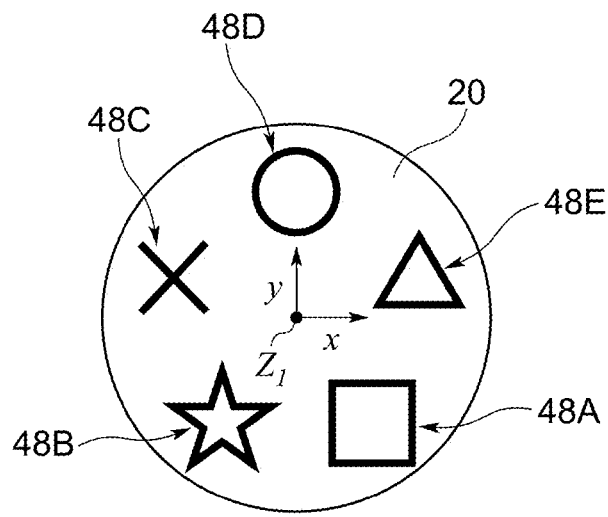

The relationship between the polar coordinate data and the orthogonal coordinate data will be described with reference to FIG. 7A to FIG. 7C. FIG. 7A shows the polishing platen 20, the pressure sensor 22, and the measurement objects. To facilitate understanding, the measurement objects in FIG. 7A are represented by various shapes (a quadrangular shape 14A, a star shape 14B, an X-shape 14C, a circular shape 14D, and a triangular shape 14E). FIG. 7B shows the measurement data obtained from the pressure sensor 22. In FIG. 7B, the horizontal axis represents an angle θ with respect to the position of the pressure sensor 22, and the vertical axis represents the radius r of the polishing platen 20. As shown in FIG. 7B, the shapes of the measurement objects 46A to 46E based on the measurement data are distorted. With the use of the following formulae (Formula 2 to Formula 4), P (x, y) coordinates at each of the pressure-sensitive points is calculated from the measurement data. Thus, the replacement data 48A to 48E are obtained as shown in FIG. 7C.

$$r = 2C_{sensor} \cdot \sqrt{\left(\frac{x}{N} - \frac{1}{2}\right)^2 + \left(\frac{y}{N} - \frac{1}{2}\right)^2} \qquad \text{[Formula 2]}$$

$$\theta = \arctan\frac{y}{x} \qquad \text{[Formula 3]}$$

$$P(x, y) = P(r, \theta) \qquad \text{[Formula 4]}$$

In the case of the present embodiment, the longitudinal direction of the second electrode 17 of the pressure sensor 22 coincides with the normal of the platen 12. A constant $C_{\_sensor}$ represents the position of the pressure-sensitive point farthest from the center of the platen 12, and a constant N represents the number of partitions of the orthogonal coordinate.

P(r, θ) in the formula (Formula 4) represents the pressure data in a discrete space, and hence, the P(r, θ) coordinates may be associated with the P (x, y) coordinates by interpolation using the pressure data. Examples of a method of associating the P(r, θ) coordinates with the P (x, y) coordinates include neighbor interpolation using a floor function and a method of performing linear interpolation using weighting values obtained from the proximity between a point (x, y) and each of four data points (r1, θ1), (r1, θ2), (r2, θ1), (r2, θ2) surrounding the point (x, y).

The data processing section 40 stores the replacement data, which is the orthogonal coordinate data, in storage section 38, and moves on to step SP6.

In step SP6, the data processing section 40 outputs the replacement data to the display section 42, and moves on to step SP7. Thereby the data processing procedure ends.

(Operation and Effects)

First, when the power supply is turned on and the conditions are set, the silicon wafer polishing device 10 starts operation on the basis of the set conditions. Specifically, when the control section 28 receives a measurement command signal from the setting input section 30, the control section 28 generates a rotation start signal and transmits the rotation start signal to the rotation control section 32. When the rotation control section 32 receives the rotation start signal, the rotation control section 32 controls the operation of the drive section, which rotationally drives the platen 12 and the head 16. At the same time, the control section 28 generates a measurement start signal, and transmits the measurement start signal to the signal acquisition section 36. Upon receiving the measurement start signal, the signal acquisition section 36 supplies the electric power to the pressure sensor 22, and scans the pressure sensor 22 at predetermined intervals (timing), to acquire measurement data from the pressure sensor 22.

Figure 8:
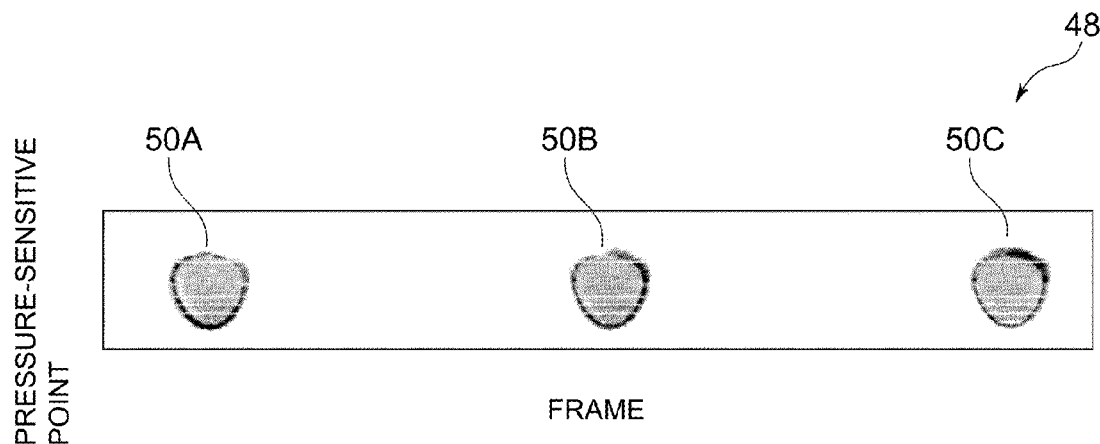
FIG. 8 is a view showing an example of measurement data.

The signal acquisition section 36 stores, in the storage section 38, the obtained measurement data for each frame. FIG. 8 shows an example of the measurement data obtained when the pressure sensor 22 is scanned at approximately 1000 Hz. In FIG. 8, the horizontal axis represents the number of frames, and the vertical axis represents the position of the pressure-sensitive point. Dark spots 50A to 50C represent the positions of the pressure-sensitive points at which the pressure sensor 22 detected the load caused by the substrate 14 passing over the pressure sensor 22. Darker the color, higher the load value. FIG. 8 shows that although the substrate 14 seems to pass over the pressure sensor 22 regularly (or evenly), there are variations among data.

Figure 9:
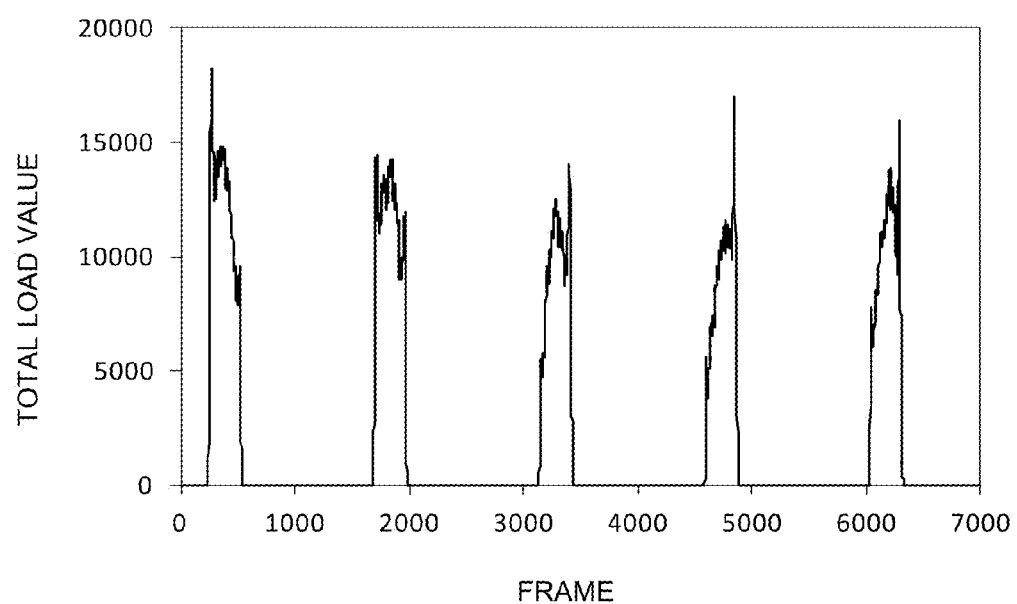
FIG. 9 is a graph showing an example of first time-series data composed of total load values obtained from the measurement data.

Then, from the measurement data, the data processing section 40 generates the first time-series data and the second time-series data in this order, and thereby calculates the time interval between the crossings (the crossing and the next crossing) of the substrate 14 over the pressure sensor 22. FIG. 9 shows an example of the first time-series data generated on the basis of the measurement data shown in FIG. 8. In FIG. 9, the horizontal axis represents the number of frames, and the vertical axis represents the total load value x. FIG. 9 shows that there are variations in the peaks of the total load values x. Accordingly, it is difficult to accurately calculate the period from the first time-series data.

Figure 10:
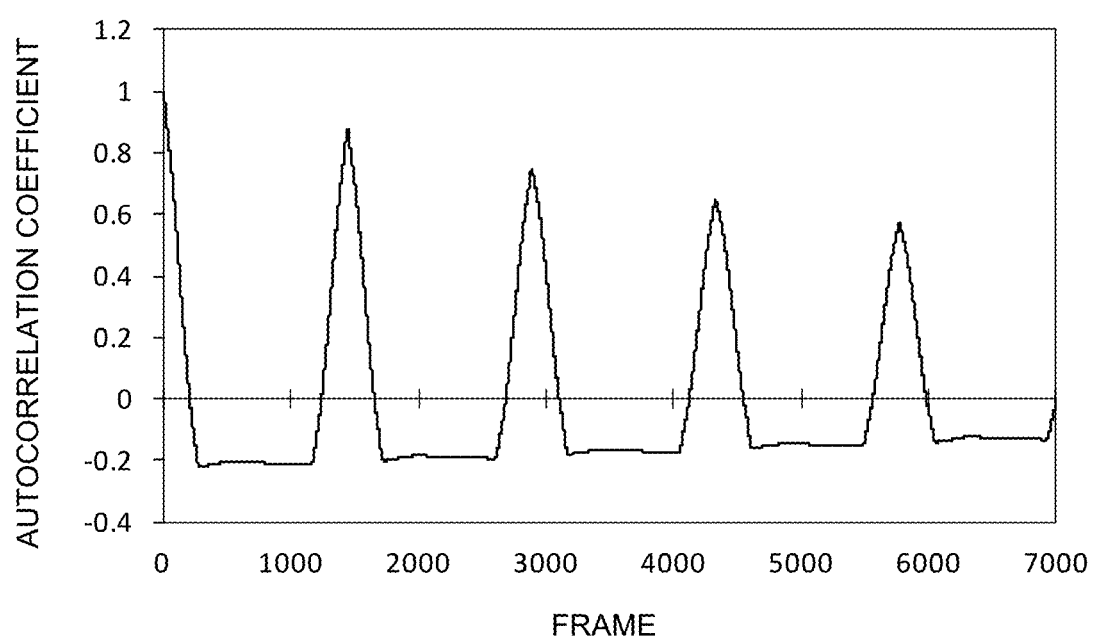
FIG. 10 is a graph showing an example of second time-series data.

The data processing section 40 obtains the autocorrelation coefficient r(h) from the first time-series data, to generate second time-series data. FIG. 10 shows an example of the second time-series data. In FIG. 10, the horizontal axis represents the number of frames, and the vertical axis represents the autocorrelation coefficient r(h). FIG. 10 shows that data without variations in the peaks is obtained by using the autocorrelation coefficient r(h). From the peak interval of the second time-series data, the data processing section 40 calculates the time interval between the crossings (the crossing and the next crossing) of the substrate 14 over the pressure sensor 22.

Then, on the basis of the time interval between the crossings of the substrate 14 over the pressure sensor 22, the data processing section 40 extracts (or calculates) the period data from the measurement data.

In this way, the pressure measurement device calculates the time interval between the crossings of the substrate 14 over the pressure sensor 22 and extracts the period data from the measurement data.

When there is no positional fluctuations, the substrate 14 is supposed to be contacting the same pressure-sensitive point(s) at the same timing in each revolution. Actually, however, as shown in FIG. 8, variations occur in the pressure distribution, and hence, the position of the substrate 14 cannot be determined accurately only by the period data of one round (one revolution or one rotation).

In the case of the present embodiment, extracting the period data from the measurement data enables the pressure measurement device to accurately superpose (overlay) the period data with each other. Thereby, the position of the substrate 14, from its center to its outer edge, is determined accurately.

Figure 11:
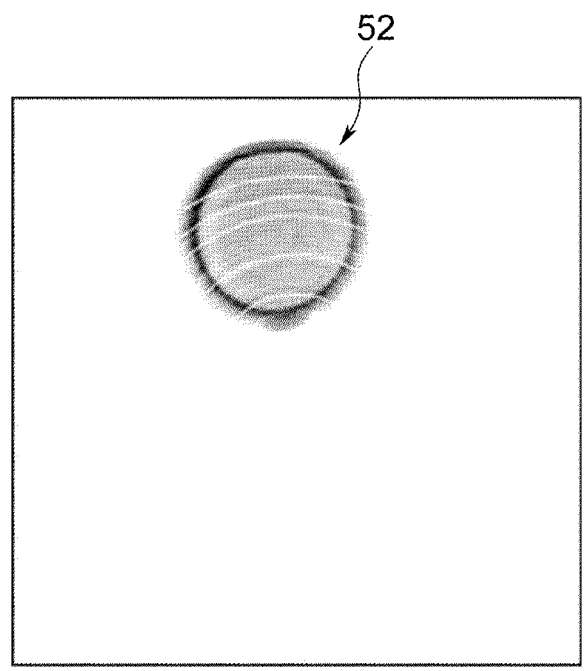
FIG. 11 is a view showing an example of replacement data obtained from period data.
Figure 12:
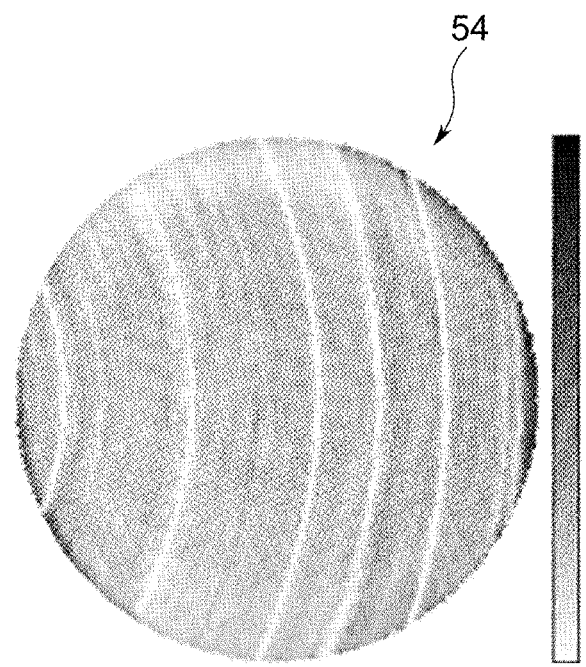
FIG. 12 is a view showing an example of pressure-sensitive data extracted from FIG. 11.

The data processing section 40 replaces the period data, which is the polar coordinates data, with orthogonal coordinate data. FIG. 11 shows an example of replacement data 52. The replacement data 52 is obtained by averaging the extracted period data, and then replacing the averaged period data with orthogonal coordinate data (in other words, the averaged period data is converted into orthogonal coordinate data, that is, the replacement data 52). The position of the substrate 14 is more accurately determined by the superposition of the period data. Therefore, as shown in FIG. 12, only a useful portion, that is, the measurement data (hereinafter referred to as "pressure-sensitive data") 54 between the time when the substrate 14 starts passing over the pressure sensor 22 and the time when the substrate 14 ends passing over the pressure sensor 22 is extracted from the replacement data 52 of FIG. 11. The pressure-sensitive data 54 extracted in this way may be used for advanced statistical processing and image processing.

As described above, with the silicon wafer polishing device 10, a change in pressure distribution under friction or lubrication with time is visualized by pressing the substrate 14 against the pressure sensor 22 provided on the platen 12.

Accurate extraction of useful period data in a time direction makes it easy to perform processing, such as processing of averaging a plurality of period data and processing of comparing a difference between period data. Since the pressure-sensitive area of each of the pressure-sensitive points is different in size, it is effective to use, for example, a method in which the data is weighted in accordance with the area, in a case where statistical processing is required.

Modified Embodiment

The present invention is not limited to the above described embodiment, and may be suitably changed within the scope and spirit of the present invention.

For example, in the above-described embodiment, the platen 12 and the substrate 14 are rotated relative to each other. The present invention is not limited to this. The main spindle of the head 16 may revolve with respect to the platen 12.

In the above-described embodiment, the pressure measurement device is used in the silicon wafer polishing device 10. The present invention is not limited to this. The pressure measurement device may be used in a device for measuring pressure of a rotating object, other than the silicon wafer polishing device. For example, the pressure measurement device may be used in a device for measuring the pressure between an end mill and a workpiece of a cutting machine, the pressure between a wiper and a windshield of an automobile, the pressure between a lens and a polishing device, the pressure between a tire of an automobile and ground plane, or the like.

Figure 13:
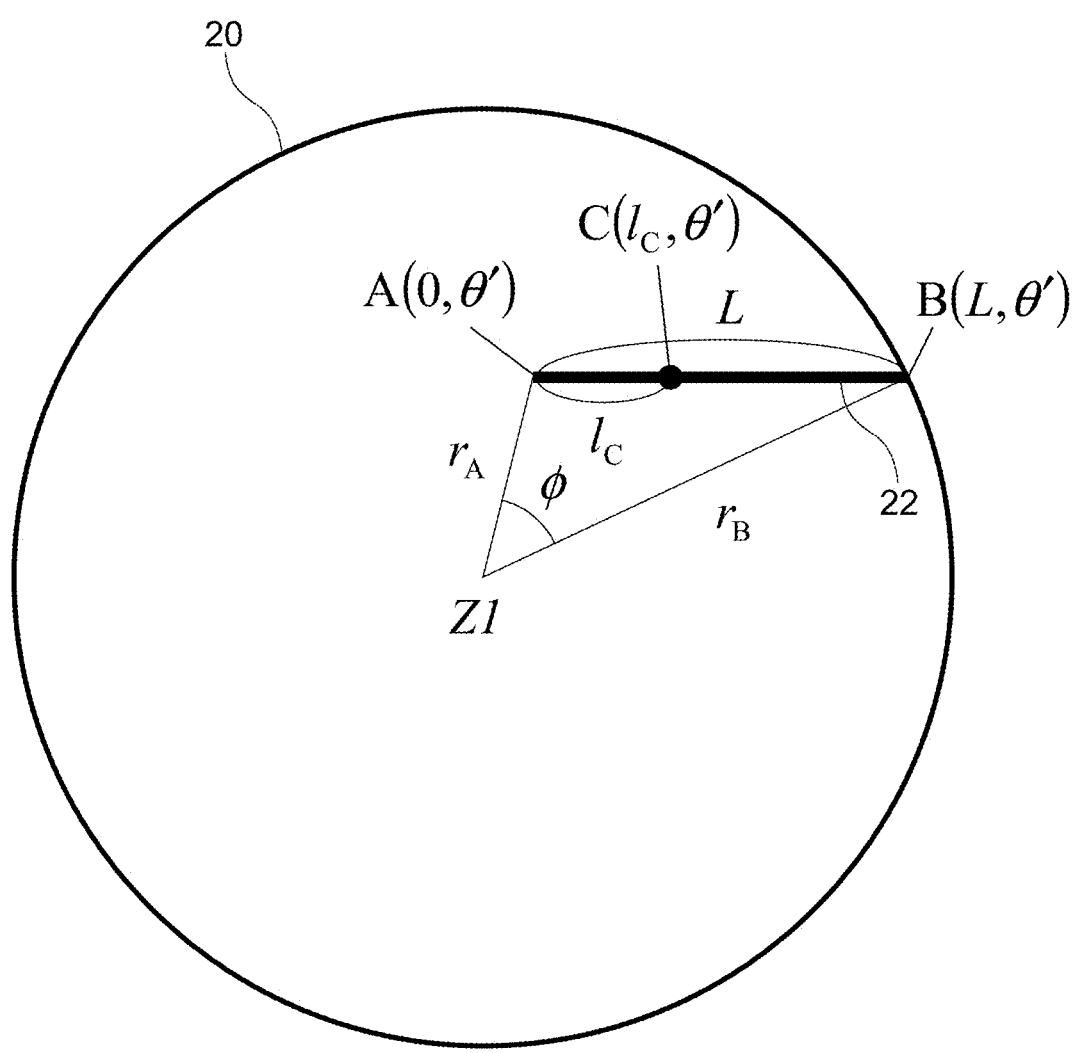
FIG. 13 is a plan view schematically showing a configuration of a platen of a silicon wafer polishing device according to a modified embodiment.

In the above-described embodiment, the pressure sensor 22 is disposed on a straight line passing through the center of the platen 12. The present invention is not limited to this. As shown in FIG. 13, the pressure sensor 22 may be disposed at a position displaced from the center of the polishing platen 20. In this case, when the following formulae (Formula 5 and Formula 6) are used, data obtained at a pressure-sensitive point C ($l_c$, $\theta'$) on the pressure sensor 22 is handled as measurement data Pc (r, $\theta$), being the polar coordinate data. Here, given that $r_A < r_B$ and $\angle Z1AB \geq 90°$.

$$r = r_A - \frac{l_C}{L}(r_A - r_B) \quad \text{[Formula 5]}$$

$$\theta = \theta' + \frac{(L + l_C)r_A - l_C r_B}{L(r_A - r_B)} \phi \quad \text{[Formula 6]}$$

In the above-described embodiment, the period data is replaced with the orthogonal coordinate data. The present invention is not limited to this.

In the above-described embodiment, the pressure sensor 22 is disposed between the polishing platen 20 and the polishing cloth 24. The present invention is not limited to this. The pressure sensor 22 may be disposed on the polishing cloth 24.

In the above embodiment, the pressure sensor 22 has one second electrode 17. The present invention is not limited to this. The pressure sensor 22 may have two second electrodes 17.

In the above embodiment, the measurement object is a substrate. The present invention is not limited to this. Since the pressure measurement device according to the present invention is capable of accurately determining the position of the measurement object by using superposition or the like, the measurement object may take any shape such as a quadrangular shape, a round (or circular) shape, a polygonal shape, or a shape of a star, as long as the measurement object has a geometric shape.

What is claimed is:

1. A pressure measurement device comprising:
   a platen having a flat surface, the platen being rotatable about a central axis orthogonal to the flat surface;
   a pressure sensor disposed in a linear form on the flat surface, the pressure sensor including a plurality of pressure-sensitive points arranged in a direction away from the central axis;
   a signal acquisition section configured to acquire measurement data obtained when a measurement object in contact with the flat surface passes over the pressure sensor a plurality of times, the measurement object moving relative to the platen and along a circular orbit on the platen; and
   a data processing section configured to calculate periods in each of which the measurement object passes over the pressure sensor, and configured to acquire period data for each of the periods from the measurement data.

2. The pressure measurement device according to claim 1, wherein the plurality of pressure-sensitive points are arranged linearly at equal intervals with each other.

3. The pressure measurement device according to claim 1, comprising
   a coating film covering a surface of the pressure sensor, the coating film having a surface area larger than a surface area of a surface of the measurement object, the surface of the measurement object being in contact with the platen.

4. A non-transitory computer-readable medium having computer-executable instructions for performing a method of measuring pressure, the method comprising:
   acquiring measurement data that is obtained when a measurement object in contact with a surface of a platen passes over a pressure sensor a plurality of times, the measurement object moving relative to the platen and along a circular orbit on the platen, the pressure sensor including a plurality of pressure-sensitive points arranged on the platen;
   calculating periods in each of which the measurement object passes over the pressure sensor; and
   acquiring period data for each of the periods from the measurement data;
   wherein calculating the periods includes calculating second time-series data based on first time-series data and calculating the period from a peak interval of the second time-series data, the first time-series data including a total load value obtained from the measurement data, the second time-series data including an autocorrelation coefficient.

5. A non-transitory computer-readable medium having computer-executable instructions for performing a method of measuring pressure the method comprising:

acquiring measurement data that is obtained when a measurement object in contact with a surface of a platen passes over a pressure sensor a plurality of times, the measurement object moving relative to the platen and along a circular orbit on the platen, the pressure sensor including a plurality of pressure-sensitive points arranged on the platen;

calculating periods in each of which the measurement object passes over the pressure sensor;

acquiring period data for each of the periods from the measurement data; and overlaying the plurality of period data with each other and determining a position of the measurement object.

6. A non-transitory computer-readable medium having computer executable instructions for performing a method of measuring pressure, the method comprising:

acquiring measurement data that is obtained when a measurement object in contact with a surface of a platen passes over a pressure sensor a plurality of times, the measurement object moving relative to the platen and along a circular orbit on the platen, the pressure sensor including a plurality of pressure-sensitive points arranged on the platen;

calculating periods in each of which the measurement object passes over the pressure sensor;

acquiring period data for each of the periods from the measurement data; and replacing the period data with orthogonal coordinate data.

* * * * *